US010397336B2

(12) United States Patent
Fontaine et al.

(10) Patent No.: US 10,397,336 B2
(45) Date of Patent: Aug. 27, 2019

(54) MECHANISM FOR MANAGING A COMMUNICATION SESSION

(71) Applicant: ORANGE, Paris (FR)

(72) Inventors: Fabrice Fontaine, Geveze (FR); Fabrice Baranski, Chantepie (FR)

(73) Assignee: Orange, Paris (FR)

( * ) Notice: Subject to any disclaimer, the term of this patent is extended or adjusted under 35 U.S.C. 154(b) by 0 days.

(21) Appl. No.: 14/653,205

(22) PCT Filed: Dec. 20, 2013

(86) PCT No.: PCT/FR2013/053233
§ 371 (c)(1),
(2) Date: Jun. 17, 2015

(87) PCT Pub. No.: WO2014/096742
PCT Pub. Date: Jun. 26, 2014

(65) Prior Publication Data
US 2015/0334192 A1  Nov. 19, 2015

(30) Foreign Application Priority Data

Dec. 20, 2012 (FR) ..................... 12 62440

(51) Int. Cl.
H04L 29/08  (2006.01)
H04L 29/06  (2006.01)
(52) U.S. Cl.
CPC ............ H04L 67/141 (2013.01); H04L 67/02 (2013.01); H04L 67/14 (2013.01); H04L 67/143 (2013.01);
(Continued)
(58) Field of Classification Search
CPC . H04L 67/14; H04L 67/2814; H04L 67/2823; H04L 67/2847; H04L 63/08;
(Continued)

(56) References Cited

U.S. PATENT DOCUMENTS 6,148,405 A * 11/2000 Liao ...................... H04L 9/3273
380/255
8,601,556 B2 * 12/2013 Kanekar ............. H04L 63/0823
709/228

(Continued)

FOREIGN PATENT DOCUMENTS

WO    2009055802 A1    4/2009

OTHER PUBLICATIONS

Gupta M, Jha SC, Koc AT, Vannithamby R. Energy impact of emerging mobile internet applications on LTE networks: issues and solutions. IEEE communications magazine. Feb. 2013;51(2):90-7.*

(Continued)

Primary Examiner — Ranodhi Serrao
Assistant Examiner — James N Fiorillo
(74) Attorney, Agent, or Firm — Haverstock & Owens LLP

(57) ABSTRACT

The invention relates to a management method for managing a communication session (SS_WS) between a terminal (1) suitable for exchanging application messages (MSG_WS) with at least one server (3) via the communication session (SS_WS). The method is characterized in that it comprises the following steps performed by a management device:
  setting up (E1) the communication session (SS_WS) for exchanging application messages between the terminal (1) and the server (3);
  initializing (E2) a time period (T_timer);
  partially closing (E3) the communication session (SS_WS) between the terminal and the management device at the end of the time period (T_timer) if no application message (MSG_WS) relating to the communication session has been received;
  detecting (E4) at least one application message (MSG_WS) relating to the communication session and coming from the server; and
(Continued)

requesting a notification server to restore (E4) the communication session (SS_WS), said notification server sending a restoration request in the form of a notification that is independent of the session.

9 Claims, 2 Drawing Sheets

(52) U.S. Cl.
CPC .......... *H04L 67/145* (2013.01); *H04L 67/146* (2013.01); *H04L 67/42* (2013.01); *H04L 69/08* (2013.01); *H04L 63/08* (2013.01)

(58) Field of Classification Search
CPC ..... H04L 63/0823; H04L 67/02; H04L 67/28; H04L 67/141
USPC ................ 709/201, 203, 219, 228, 231, 227
See application file for complete search history.

(56) References Cited

U.S. PATENT DOCUMENTS

| | | | |
|---|---|---|---|
| 9,143,550 B2* | 9/2015 | Mandyam | H04L 67/02 |
| 2005/0289264 A1* | 12/2005 | Illowsky | G06F 1/3203 |
| | | | 710/104 |
| 2006/0123119 A1 | 6/2006 | Hill et al. | |
| 2006/0153064 A1* | 7/2006 | Caballero-McCann | |
| | | | H04L 67/14 |
| | | | 370/216 |
| 2006/0184535 A1 | 8/2006 | Kaluskar et al. | |
| 2006/0294241 A1* | 12/2006 | Cherian | H04L 67/14 |
| | | | 709/227 |
| 2008/0256254 A1* | 10/2008 | Kim | H04N 21/2381 |
| | | | 709/231 |
| 2009/0049180 A1* | 2/2009 | El | H04L 67/14 |
| | | | 709/227 |
| 2010/0191859 A1* | 7/2010 | Raveendran | H04L 65/605 |
| | | | 709/231 |
| 2010/0281107 A1* | 11/2010 | Fallows | G06F 9/54 |
| | | | 709/203 |
| 2010/0306547 A1* | 12/2010 | Fallows | G06F 21/305 |
| | | | 713/178 |
| 2010/0323728 A1 | 12/2010 | Gould et al. | |
| 2010/0325420 A1* | 12/2010 | Kanekar | H04L 63/0823 |
| | | | 713/151 |
| 2011/0022651 A1* | 1/2011 | Hwang | H04N 21/6402 |
| | | | 709/201 |
| 2011/0044334 A1* | 2/2011 | Miyashita | H04L 63/08 |
| | | | 370/389 |
| 2011/0302316 A1* | 12/2011 | Chou | H04L 67/14 |
| | | | 709/228 |
| 2012/0110203 A1* | 5/2012 | Ozawa | H04L 67/2823 |
| | | | 709/231 |
| 2012/0179934 A1 | 7/2012 | Ramaiah et al. | |
| 2012/0185561 A1* | 7/2012 | Klein | H04L 67/2814 |
| | | | 709/217 |
| 2012/0210243 A1* | 8/2012 | Uhma | G06F 9/45529 |
| | | | 715/744 |
| 2012/0254362 A1* | 10/2012 | Li | H04W 4/025 |
| | | | 709/218 |
| 2013/0329875 A1* | 12/2013 | Mairs | H04M 7/0024 |
| | | | 379/93.19 |
| 2013/0346610 A1* | 12/2013 | Liu | H04L 41/0213 |
| | | | 709/225 |
| 2014/0029496 A1* | 1/2014 | Ise | H04W 52/0225 |
| | | | 370/311 |
| 2014/0068094 A1* | 3/2014 | Burch | H04L 67/14 |
| | | | 709/229 |
| 2015/0095462 A1* | 4/2015 | Manner | H04L 67/2847 |
| | | | 709/219 |

OTHER PUBLICATIONS

Gupta M, Jha SC, Koc AT, Vannithamby R. Energy impact of emerging mobile internet applications on LTE networks: issues and solutions. IEEE communications magazine. Feb. 2013;51(2):90-7 (Year: 2013).*

* cited by examiner

MECHANISM FOR MANAGING A COMMUNICATION SESSION

TECHNICAL FIELD

The invention relates to the general field of telecommunication networks, and more particularly to communications between a client terminal and server equipment on a telecommunications network of the Internet type.

STATE OF THE ART

In known manner, in a network of Internet type, communication between a client terminal and server equipment takes place using the hypertext transfer protocol (HTTP), which is a client-server communications protocol that has been developed in particular for the worldwide web. The best known HTTP clients are web browsers making available applications that are designed to be accessed remotely; the hypertext markup language (HTML) is a data format designed to represent the web pages of such applications.

The first versions of the HTML protocol did not make provision for bidirectional communication between the client and the server. The client had to connect to the server via a polling mechanism (i.e. a request and response mechanism) using the HTTP protocol. More recently, the Websocket protocol has been introduced in order to provide bidirectional communication between the client and the server. Websocket is a standard specifying both a network protocol and a programming interface that can be used by an application on any web server or client. The protocol was standardized by the Internet engineering task force (IETF) in its request for comments (RFC) 6455, and the corresponding programming interface is presently being standardized by the organization known as W3C (reference: The web sockets API; W3C working draft).

Websocket considerably improves communication between the server and the client, but requires the client to maintain the Websocket communication session, and thus to maintain an active Internet connect, in order to be capable of communicating at any time with the server. Maintaining such a connection can be pointlessly expensive. A terminal consumes energy when its Internet connection is active and data is being exchanged. With certain pieces of equipment, and in particular with mobile appliances such as smartphones, it is possible to disconnect the Internet connection when it is not necessary to use it. Disconnecting the Internet connection serves to reduce the energy consumption of the terminal, but prevents any communication. In order to reduce energy consumption, it is also possible to stop only the Websocket application so as to cease receiving and transmitting that type of data. However, under such circumstances, the terminal loses the current session and needs to establish a new Websocket session if it seeks to communicate with the server subsequently.

The invention offers a solution that does not present the drawbacks of the state of the art.

THE INVENTION

To this end, in a functional aspect, the invention provides a management method for managing a communication session between a terminal suitable for exchanging application messages with at least one server via the communication session, said method begin characterized in that it comprises the following steps performed by a management device:

setting up the communication session for exchanging application messages between the terminal and the server;

initializing a time period;

partially closing the communication session between the terminal and the management device at the end of the time period if no application message relating to the communication session has been received;

detecting (E4, LST) at least one application message (MSG_WS) relating to the communication session and coming from the server; and requesting a notification server to restore (E4) the communication session (SS_WS), said notification server sending a restoration request in the form of a notification that is independent of the session.

Thus, the invention enables the energy consumption of the terminal to be managed in intelligent manner. A period of inactivity on the communication session set up between the terminal and the server that lasts for too long leads to the session being closed by the management method. While the session is closed, the terminal consumes less energy, which is particularly advantageous for mobile terminals (such as smartphones, computer tablets, etc.) where it is important to reduce electricity consumption. The management method makes it possible to restore the session that has been closed in part as soon as a message is received for this communication session. By detecting messages relating to the communication session between the terminal and the server, the management method acts as a kind of proxy. The proxy is located so as to "spy" on the session and it requests that the session be restored between the terminal and the server, and more precisely between the terminal and itself, on detecting a message for the terminal. Thus, messages can once more be exchanged between the terminal and the server, as though the session had never been partially closed. In a particular implementation, after the session has been partially closed, the communication channel may be disconnected, and subsequently restored when the management device receives a message coming from the server.

In a variant of this embodiment, the management method further includes a step of forwarding to the terminal the message detected on the communication session.

Thus, the management method enables a message that was previously sent to the terminal while the session between the terminal and the management device was partially closed to be forwarded so that that message is not lost to the terminal. Communication between the server and the terminal is thus transparent.

In a second particular implementation of the invention, which may be performed as an alternative to or together with the above implementation, the communication session is of the Websocket type.

Websocket applications consume a large amount of energy for a terminal having little battery life, such as a smartphone or a tablet. The invention makes it possible to disconnect as soon as there is no longer any activity on the channel connecting the terminal to the Internet (Zigbee, WiFi, etc.), while ensuring that communication can be resumed as soon as that is desired once more.

In another implementation of the management method, a session-opening message sent by the terminal includes information informing the management device that the terminal is arranged to receive a request to re-open the session in the form of said notification.

The management device can thus distinguish between terminals that are suitable for receiving a request to re-open a session in the form of a notification that is independent from the session and terminals that do not support this function.

In another functional aspect, the invention provides a communication method for a terminal suitable for exchanging application messages with at least one server via a communication session, said method being characterized in that it comprises the following steps:
- sending a message to open a communication session;
- receiving a session identifier for the communication session;
- closing the session;
- receiving a request to re-open the session in the form of a notification that is independent of the session; and
- sending a message to re-open the communication session, the message including the identifier of the session.

Energy savings should thus be made at the terminal.

In a particular implementation of the communication method, the session opening message sent by the terminal includes information informing the management device that the terminal is arranged to receive a request to re-open the session in the form of said notification.

Thus, a terminal seeking to set up a communication session, e.g. of the Websocket type, while consuming little energy, may make a request that is different from a terminal that seeks to set up a "standard" session. During the stage of negotiating the request, the indication that an optimized session is desired, e.g. signaled by means of a specific parameter, makes it possible subsequently for the Websocket session to be closed and then re-opened in a manner that is transparent for the server and very simple for the terminal, since it suffices for the terminal to add a parameter to the existing command in the Websocket negotiation stage, and then to store the session identifier that will be used subsequently for re-opening purposes.

In a hardware aspect, the invention also provides a device for managing a communication session between a terminal suitable for exchanging application messages with at least one server via the communication session, said device being characterized in that it comprises:
- a module for setting up the communication session to exchange application messages between the terminal and the server;
- a module for initializing a time period;
- a module for detecting an application message relating to the communication session;
- a module for partially closing the communication session between the terminal and the management device at the end of the time period, if no message has been detected; and
- a module for requesting a notification server to restore the communication session, said module being activated on detecting an application message relating to the communication session as received from the server.

In another hardware aspect, the invention also provides a home gateway including a device as described above.

In another hardware aspect, the invention also provides a terminal suitable for exchanging application messages with at least one server via a communication session, said terminal comprising:
- a module suitable for sending a message to open a communication session;
- a module for receiving a session identifier for the communication session;
- a module for closing the session;
- a module for receiving a request to re-open the session in the form of a notification independent of the session; and
- a module for sending a message to re-open the communication session, the message including the identifier of the session.

In another hardware aspect, the invention also provides a system comprising a terminal and a management device as described above.

In another hardware aspect, the invention also provides a computer program suitable for being run on a device as described above, the program including code instructions that, when the program is executed by a processor, perform the steps of the management method of a communication session as defined above.

This program may be run in the device inserted in any piece of equipment in the local network, and in particular in the above-defined home gateway.

In yet another hardware aspect, the invention also provides a computer program suitable for being run on a terminal as described above, the program including code instructions that, when the program is executed by a processor, perform the steps of the communication method of a terminal as defined above.

The invention can be better understood on reading the following description given by way of example and made with reference to the accompanying drawings.

THE FIGURES

DETAILED DESCRIPTION OF AN IMPLEMENTATION ILLUSTRATING THE INVENTION

Figure 1:
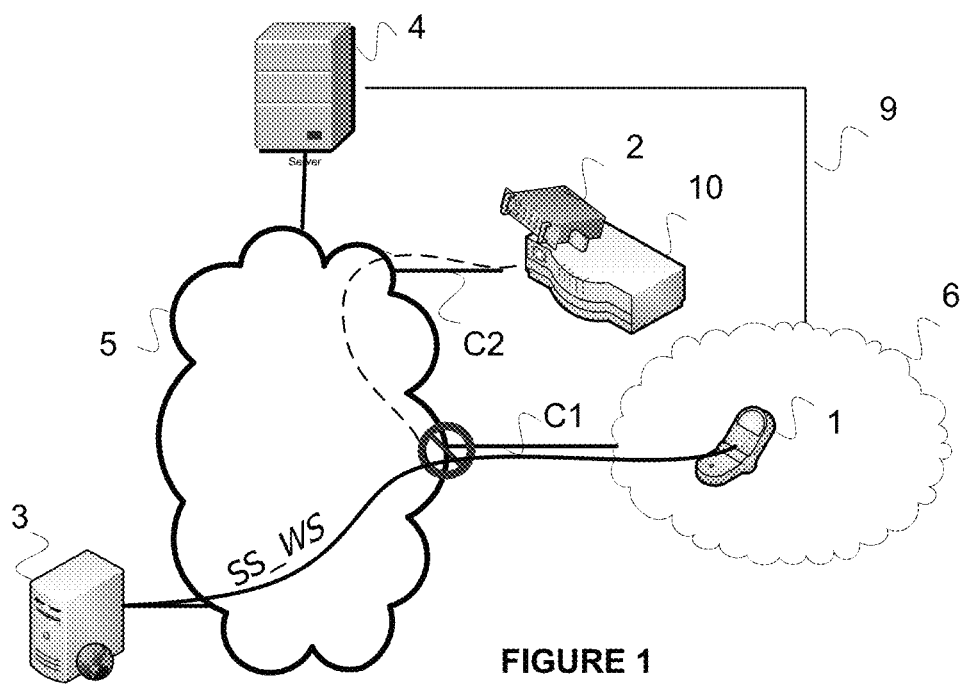
FIG. 1 shows the general context of an implementation of the invention.

FIG. 1 shows the general context of an implementation of the invention.

An application server (3) is connected to the Internet (5). Communication between the server (3) and a client terminal (1) takes place via the Internet using the HTTP protocol. Web pages may for example be presented to the client terminal in HTML format, a data format designed for representing such pages.

The client terminal (1) has a web client; an application page is typically presented on the terminal (1) by using a web browser. The server (3) offers web type applications that require data to be transferred between the server and a terminal in bidirectional mode, e.g. a weather forecast application or an instant messaging application having pages that are designed to be presented on the terminal by means of such a browser. The applications server sends data regularly to the terminal, e.g. notifications whenever new messages arrive.

In this example, the client terminal (1) is a mobile telephone associated with computer and Internet browsing functions, known as a smartphone, suitable for communicating with the server, but it could equally well be a laptop computer, a tablet computer, etc. Below, the term "client terminal", or more simply "terminal" is used to designate any device suitable for connecting to a web server (3) via a communication channel and for communicating with the server in duplex mode, also referred to as bidirectional mode, i.e. a mode that allows application messages to be exchanged in both directions. As mentioned above, the Websocket protocol defines a bidirectional communication mechanism between a client and a server on the web. In the selected implementation, the messages are of the Websocket type and they are exchanged during a Websocket communication session, referred to more simply as a Websocket session and abbreviated as SS_WS in FIGS. 1 and 3.

The client terminal (1) is in a network (6), e.g. a mobile network. More broadly, and without going beyond the ambit of the invention, the network (6) could be a network of any type (cellular, global system for mobile communications (GSM), universal mobile telecommunications system (UMTS), wireless (WiFi), etc.) providing the terminal (1) is suitable for communicating with the server (3) via a bidirectional protocol, and in particular the Websocket protocol. In another implementation, the terminal (1) could equally well be connected directly to the Internet (5) in wired mode.

A server (4) is also connected to the Internet. This server transmits data to the terminals (1) of the mobile network (6); this server, which is sometimes referred to as a notification server, may for example be a server for notifying messages of the Zigbee type, or indeed of the short message service center (SMSC) type, i.e. it serves to manage the transfer of short message service (SMS) messages (in text or binary mode) to mobile telephones via a link (9) established between the server and the mobile network. The server stores the message and then forwards it to the destination when the destination is present on the network (mobile switched on). In this implementation, it is in particular the server (4) that is capable of putting the terminal (1) on standby in order to deactivate some of its functions so that it consumes less energy. Conversely, the server (4) is also capable of activating certain functions of the terminal. The notification server can thus forward notifications that are independent of a session being established between a client terminal and the application server. The term "independent" is used to mean that the notifications are not conveyed by means of the session.

The invention enables the Websocket session established between the client and the server to be managed in inexpensive manner by introducing a piece of equipment or module (2) referred to as a "web proxy" (referenced PWS in FIG. 2), that is capable of substituting itself for the terminal (1) when the Websocket session is deactivated and the terminal thus becomes incapable of responding to Websocket messages coming from the server (3). The proxy module proposes a kind of alternative communication channel (represented by dashed lines in the figure) that is suitable for intercepting the messages of the Websocket session SS_WS and thus, in this context, for substituting itself for the terminal.

The invention is described in greater detail with reference to FIGS. 2 and 3.

Figure 2:
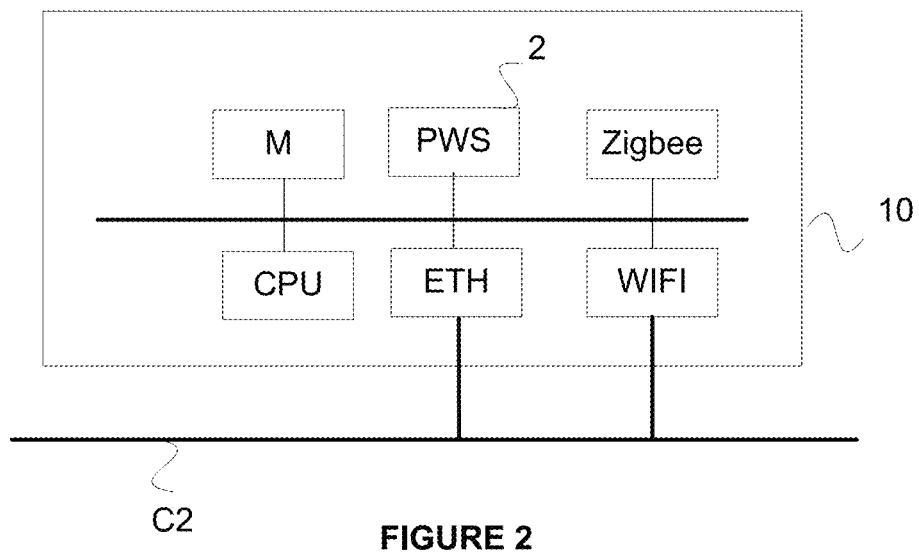
FIG. 2 shows an architecture for a home gateway performing an implementation of the invention.

FIG. 2 shows the architecture of equipment that performs an implementation of the invention. The proxy module (2, PWS) may be situated in any equipment that is connected to the Internet, and by way of example in this implementation in a home gateway (10), which equipment makes it possible to redirect, or "route", data packets between the various terminals and networks to which it is connected.

In conventional manner, the gateway (10) comprises memories (M) associated with a processor (CPU). The memories may be of the read only memory (ROM) type or of the random access memory (RAM) type or indeed of the flash type. In the invention, a portion of the memory M contains the software portion of the device (PWS) of the invention that is performed by means of software and/or hardware components. The term "module" may correspond equally well to a software component or to a hardware component or to a set of hardware and software components, a software component itself corresponding to one or more computer programs or subprograms, or in more general manner to any program element suitable for performing a function or a set of functions as described for the modules in question. In the same manner, a hardware component corresponds to any element of a hardware assembly suitable for performing a function or a set of functions for the module in question (integrated circuit, smart card, memory card, etc.). The gateway 10 also has a certain number of modules that enable it to communicate with the outside via various protocols over different physical links; in FIG. 2, there are thus shown diagrammatically an Ethernet module for wired communication with the Internet and for wireless communication, a WiFi module, and a Zigbee module.

Figure 3:
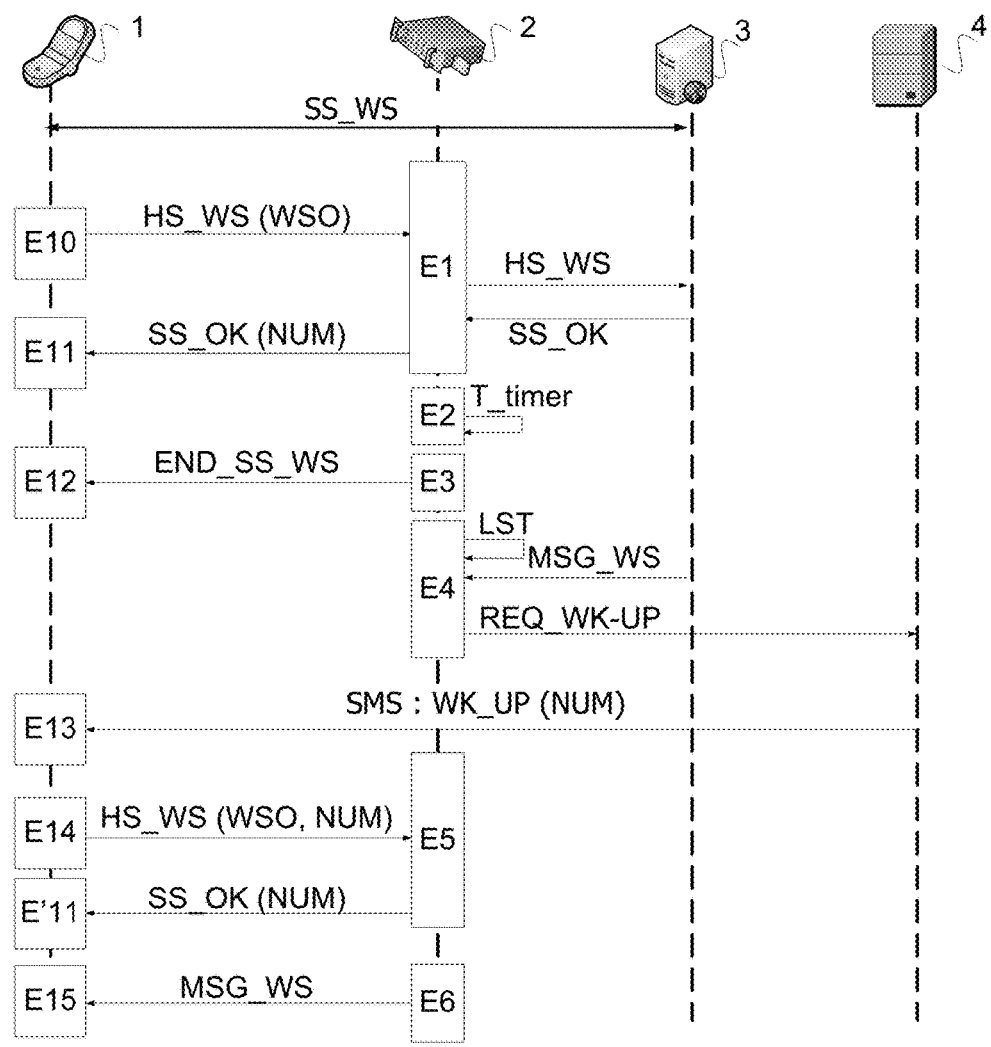
FIG. 3 is a timing diagram showing exchanges between the various pieces of equipment when performing the invention.

FIG. 3 shows the exchanges between the client terminal (1), the proxy module (2) of the invention, the Websocket server (3), and the mobile server (4).

The invention may be applied to any type of terminal network and also to any type of link between the terminal and the Internet: the physical link (C1) between the terminal 3 and the Internet may be of the wired type (Ethernet) or of the wireless type (WiFi, 3G, 4G, Zigbee). The network hosting the terminal may be a local network or a mobile network, or indeed a radio medium for communication using the Zigbee protocol (wireless technology using low power radio that enables messages complying with the Zigbee protocol, based on the IEE 802.15.4 standard, to be exchanged over a radio channel). In the context of this implementation, it is assumed that the application protocol used for communication between the server and the terminal is of the Websocket type. Nevertheless, the invention is not restricted to Websocket and it could be applied to the context of any other bidirectional communication session between a server and a communication.

In order to establish a Websocket session or connection, prior negotiation is undertaken by exchanging HTTP messages between the client (1) and the server (3). This negotiation, referred to as handshaking, serves to set up a communication session (SS_WS) for exchanging application messages in compliance with the Websocket protocol between a client and a server of the network. The data may subsequently be sent and received by the two end points that are constituted in this implementation by the smartphone (1) and the server (3) by using the Websocket protocol until the Websocket connection or session is closed. In this implementation, and as shown in FIG. 3, the proxy (2) receives the messages of this initial stage. In particular, during a step E10, the mobile terminal (1) initiates handshaking by adding an additional parameter to the standard message defined by the standard, which parameter makes a request to the proxy for an optimized Websocket session (WSO). Alternatively, this parameter may be in the form of a command, a request, etc., depending on the implementation used. The session-opening message sent by the terminal thus includes information telling the proxy that the terminal is arranged to receive a session re-opening request in the form of a notification that is independent of the session. Thus, only those terminals that need to deactivate the session, e.g. for the purpose of saving energy (smartphones, etc.), need to request this optimized mode, whereas other terminals (computers, etc.) set up a standard session.

By way of example, the Web-Socket-Extensions field (in compliance with the above-mentioned RFC 6455 specification) may be used to transmit this information. By way of example, during a handshake exchange:

1. The client sends a frame corresponding to the message HS_WS(WSO) or the message HS_WS(WSO, NUM) in FIG. 3:

```
GET /chat HTTP/1.1
    Host: server.example.com
    Upgrade: websocket
    Connection: Upgrade
    Sec-WebSocket-Key: dGhlIHNhbXBsZSBub25jZQ==
    Origin: http://example.com
    Sec-WebSocket-Protocol: chat, superchat
    Sec-WebSocket-Version: 13
```

Thereafter, depending on whether or not the client has a previously received number, i.e. depending on whether the message was HS_WS(WSO) or HS_WS(WSO,NUM):

```
Sec-WebSocket-Extensions: websocket-lowpower
Or:
Sec-WebSocket-Extensions: websocket-lowpower; sessionid=xxxx
```

In a variant, it is also possible to add as a parameter a time count value (corresponding to the time that should be allowed to elapse before detecting inactivity, as discussed below).

2. The server responds to the message (corresponding to the message SS_OK(NUM) in FIG. 3):

```
HTTP/1.1 101 Switching Protocols
Upgrade: websocket
Connection: Upgrade
Sec-WebSocket-Accept: s3pPLMBiTxaQ9kYGzzhZRbK+xOo=
Sec-WebSocket-Extensions: websocket-lowpower ; sessionid=xxxx
```

The proxy module (2) receives the handshake message (HS_WS) during a step E1 of managing the setting up of the communication session. Thereafter, during this step E1, the proxy module retransmits the handshake message (HS_WS) to the web server for which it was originally intended, receives the confirmation from the server (SS_OK) if it authorizes the session, i.e. if all the necessary conditions are satisfied for it to accept a Websocket session with the terminal (1), and retransmits to the terminal (1) the connection acknowledgment (SS_OK). A session number (NUM) is also transmitted to the terminal (1). This is a unique identifier managed by the proxy module enabling it to associate the terminal and the server. By way of example, for this purpose, the proxy module may maintain a table that comprises, for each session number, the address of the terminal and the corresponding address of the server.

During a step E2, the proxy module initializes a time period (T_timer), e.g. five minutes. In the above-mentioned variant, this parameter may be retransmitted using Sec-WebSocket-Extensions, enabling the client to specify the length of waiting time before detecting inactivity.

If at the end of this period of time, no message has been detected coming from the server on the Websocket session (SS_WS), the communication session is declared inactive and, during a step E3, the proxy transmits an end of Websocket session command to the terminal (message: END_SS_WS). This type of message is standardized in RFC 6455.

From this moment, the Websocket session (SS_WS) is partially closed between the terminal and the proxy module. The corresponding physical link (radio, mobile, etc.) may optionally be disconnected, in order to reduce energy consumption at the terminal. Although this possibility is made available by the session being closed in accordance with the invention, it does not itself form part of the invention.

During a step E4 following closure, the proxy module takes charge of the Websocket session (SS_WS), in particular by listening (LST) to application messages exchanged on this session: so long as no message is detected, the proxy listens (LST) and the session remains closed. When a Websocket information message (MSG_WS) is detected coming from the server, the method sends a message to the notification server (4) requesting it to wake up the session (SS_WS) and it leaves the step E4. The notification server wakes up the session by sending a notification, e.g. by using a binary SMS message (SMS: WK_UP) requesting it to reactivate the Websocket session, with the number (NUM) of the Websocket session that was previously interrupted being passed as a parameter. It should be recalled at this point that the notification is sent independently of the session. The purpose of this step is to transmit Websocket reconnection information to the terminal by means (SMS, Zigbee, etc.), where possible means that consume little energy, in order to conserve the benefit of this period of inactivity.

The notification, e.g. the message, is received by the terminal during a step E13.

During a step E14 following the waking up of the session, a new negotiation or handshake stage is initiated by the mobile terminal. This stage is very similar to that of step E10: the mobile terminal (1) initiates the Websocket handshake by adding to the standard message as defined by the standard an additional parameter for requesting an optimized Websocket session (WSO) and also recalling, unlike step E10, the session number (NUM) in its message (HS_WS (WSO, NUM)). The proxy (2) receives this message during a step E5 for managing restoration of the communication session and it transmits the connection acknowledgment (SS_OK) to the terminal together with the session number (NUM).

Once the session is restored, the proxy module needs to forward the Websocket message (MSG_WS) it has previously received from the server to the terminal, during a step E6.

Thus, as seen from the server, everything has taken place as though the session had not been interrupted. The same applies for the terminal, providing the optimized session mode made available by the invention was requested. For the terminal, the method is particularly advantageous since it makes it possible to close the session during periods of inactivity, with closure of the session possibly being followed, depending on particular implementations, by closures and/or disconnections of the physical link carrying the session (e.g. disconnecting the radio channel or the Ethernet link C1, deactivating Ethernet, WiFi, Zigbee modules of the terminal, etc.).

Naturally, the above-described implementation is given purely by way of non-limiting indication and numerous modifications may easily be made thereto by the person skilled in the art without thereby going beyond the ambit of the invention.

In particular, the invention may also be associated with a device for putting the terminal on standby and enabling it to wake up only when server information is transmitted thereto.

The invention claimed is:

1. A management method for managing a communication session established between a terminal and a server via a communication session, said method being characterized in that the method comprises the following steps performed by a management device that is independent of the server:
   transmitting to the terminal a session identifier for the communication session, wherein the session identifier is maintained by the management device and enables the management device to associate the terminal and the server;
   initializing a time period corresponding to a time that should be allowed to elapse before detecting inactivity of the communicating session;
   at the end of the time period, if no application message relating to the communication session has been received, transmitting a command to the terminal, to end the session;
   after the end of the session:
   detecting at least one application message relating to said communication session and coming from the server;
   sending a message to the notification server requesting the notification server to wake up said session, said notification server sending a restoration request in the form of a notification that is independent of the session, the notification including the session identifier, wherein a session-opening message sent by the terminal includes information informing the management device that the terminal is arranged to receive a request to re-open the session in the form of said notification; and
   forwarding to the terminal the message detected on the communication session.

2. The management method according to claim 1, characterized in that the communication session is of the Websocket type.

3. A communication method for a terminal suitable for exchanging application messages with at least one server via a communication session, said method being characterized in that the method comprises the following steps:
   sending a message to open a communication session to a management device that is independent of the server, wherein the message provides a time period corresponding to a time that should be allowed to elapse before detecting inactivity of the communicating session;
   receiving a session identifier for the communication session, wherein the session identifier is maintained by the management device and enables the management device to associate the terminal and the server;
   receiving a command from the management device to close the session;
   closing the session;
   after the end of the session:
   receiving a request to re-open the session in the form of a notification that is independent of the session, the request including the session identifier, wherein the session opening message sent by the terminal includes information informing the management device that the terminal is arranged to receive a request to re-open the session in the form of said notification; and
   sending a message to re-open the communication session, the message including the identifier of the session.

4. A device for managing a communication session established between a terminal and a server via the communication session, said device being characterized in that the device is independent of the server and it comprises:
   a non-transitory computer-readable memory comprising program code instructions stored thereon;
   a processor configured by the instructions to perform acts comprising:
   setting up the communication session to exchange application messages between the terminal and the server;
   transmitting to the terminal a session identifier for the communication session, wherein the session identifier is maintained by the device and enables the device to associate the terminal and the server;
   initializing a time period corresponding to a time that should be allowed to elapse before detecting inactivity of the communicating session;
   at the end of the time period, if no message has been detected, transmitting a command to the terminal, to end the session between the terminal and the management device;
   after the end of the session:
   detecting an application message relating to the communication session;
   sending a message to a notification server requesting the notification server to wake up said communication session on detecting an application message relating to the communication session as received from the server, wherein said message includes the session identifier, and a session-opening message sent by the terminal includes information informing the management device that the terminal is arranged to receive a request to re-open the session in the form of said notification; and
   forwarding to the terminal the message detected on the communication session.

5. The device according to claim 4, wherein the device is a home gateway.

6. A terminal suitable for exchanging application messages with at least one server via a communication session, said terminal comprising:
   a non-transitory computer-readable memory comprising program code instructions stored thereon;
   a processor configured by the instructions to perform acts comprising:
   sending a message to open a communication session to a management device that is independent of the server, wherein the message provides a time period corresponding to a time that should be allowed to elapse before detecting inactivity of the communicating session;
   receiving a session identifier for the communication session, wherein the session identifier is maintained by the management device and enables the management device to associate the terminal and the server;
   receiving a command from the management device to close the session;
   closing the session;
   after the end of the session:
   receiving a request to re-open the session in the form of a notification independent of the session, the request including the session identifier, wherein the session opening message sent by the terminal includes information informing the management device that the terminal is arranged to receive a request to re-open the session in the form of said notification; and
   sending a message to re-open the communication session, the message including the identifier of the session.

7. A system comprising:
a terminal suitable for exchanging application messages with at least one server via a communication session, said terminal comprising:
a non-transitory computer-readable memory comprising program code instructions stored thereon;
a processor configured by the instructions to perform acts comprising:
sending a message to open a communication session, wherein the message provides a time period corresponding to a time that should be allowed to elapse before detecting inactivity of the communicating session;
receiving a session identifier for the communication session;
closing the session;
after the end of the session:
receiving a request to re-open the session in the form of a notification independent of the session, the request including the session identifier, wherein the session opening message sent by the terminal includes information that the terminal is arranged to receive a request to re-open the session in the form of said notification; and
sending a message to re-open the communication session, the message including the identifier of the session; and
a device for managing the communication session established between the terminal and the server via the communication session, said device being characterized in that the device is independent of the server and comprises:
a non-transitory computer-readable memory comprising program code instructions stored thereon;
a processor configured by the instructions to perform acts comprising:
setting up the communication session to exchange application messages between the terminal and the server;
transmitting to the terminal a session identifier for the communication session, wherein the session identifier is maintained by the device and enables the device to associate the terminal and the server;
initializing a time period corresponding to a time that should be allowed to elapse before detecting inactivity of the communicating session;
at the end of the time period, if no message has been detected, transmitting a command to the terminal, to end the session between the terminal and the management device;
after the end of the session:
detecting an application message relating to the communication session;
requesting a notification server to restore the communication session, on detecting an application message relating to the communication session as received from the server, wherein said request includes the session identifier, and a session-opening message sent by the terminal includes information informing the management device that the terminal is arranged to receive a request to re-open the session in the form of said notification; and
forwarding to the terminal the message detected on the communication session.

8. A computer program suitable for being run on a device for managing a communication session established between a terminal and a server via the communication session, said device being characterized in that the device is independent of the server and comprises:
a non-transitory computer-readable memory comprising program code instructions stored thereon;
a processor configured by the instructions to perform acts comprising:
setting up the communication session to exchange application messages between the terminal and the server;
transmitting to the terminal a session identifier for the communication session, wherein the session identifier is maintained by the device and enables the device to associate the terminal and the server;
initializing a time period corresponding to a time that should be allowed to elapse before detecting inactivity of the communicating session;
at the end of the time period, if no message has been detected, transmitting a command to the terminal to end the session between the terminal and the management device;
after the end of the session:
detecting an application message relating to the communication session;
sending a message to a notification server requesting the notification server to wake up said communication session on detecting an application message relating to the communication session as received from the server, wherein said message includes the session identifier, and a session-opening message sent by the terminal includes information informing the management device that the terminal is arranged to receive a request to re-open the session in the form of said notification; and
forwarding to the terminal the message detected on the communication session;
the program including code instructions that, when the program is executed by a processor, to form the steps of a management method for managing the communication session between the terminal, said method begin characterized in that it comprises the following steps performed by the device:
initializing a time period corresponding to a time that should be allowed to elapse before detecting inactivity of the communicating session;
partially closing the communication session between the terminal and the management device at the end of the time period if no application message relating to the communication session has been received;
after the end of the session:
detecting at least one application message relating to the communication session and coming from the server;
requesting a notification server to restore the communication session, said notification server sending a restoration request in the form of a notification that is independent of the session, wherein said request includes the session identifier, and a session-opening message sent by the terminal includes information informing the management device that the terminal is arranged to receive a request to re-open the session in the form of said notification; and
forwarding to the terminal the message detected on the communication session.

9. A computer program suitable for being run on a terminal suitable for exchanging application messages with at least one server via a communication session, said terminal comprising:
a non-transitory computer-readable memory comprising program code instructions stored thereon;
a processor configured by the instructions to perform acts comprising:

sending a message to open a communication session to a management device that is independent of the server, wherein the message provides a time period corresponding to a time that should be allowed to elapse before detecting inactivity of the communicating session;

receiving a session identifier for the communication session, wherein the session identifier is maintained by the management device and enables the management device to associate the terminal and the server;

receiving a command from the management device to close the session;

closing the session;

after the end of the session:

receiving a request to re-open the session in the form of a notification independent of the session, the request including the session identifier, wherein the session opening message sent by the terminal includes information informing the management device that the terminal is arranged to receive a request to re-open the session in the form of said notification; and sending a message to re-open the communication session, the message including the identifier of the session, the program including code instructions that, when the program is executed by a processor, to form the steps of a communication method for the terminal, said method being characterized in that it comprises the following steps:

sending a message to open a communication session;

receiving a session identifier for the communication session;

receiving a command to close the session;

closing the session;

after the end of the session:

receiving a request to re-open the session in the form of a notification that is independent of the session, the request including the session identifier; and sending a message to re-open the communication session, the message including the identifier of the session.

* * * * *